United States Patent [19]

Wasserman

[11] 4,223,666
[45] Sep. 23, 1980

[54] TOROIDAL SOLAR COLLECTION AND ENERGY STORAGE APPARATUS

[76] Inventor: Kurt J. Wasserman, P.O. Box 77, Port Jervis, N.Y. 12771

[21] Appl. No.: 36,874

[22] Filed: May 7, 1979

[51] Int. Cl.³ .................................................. F24J 3/02
[52] U.S. Cl. .................................... 126/429; 126/400; 126/430; 126/449; 126/436
[58] Field of Search ...................... 126/400, 428-432, 126/419, 426, 450, 900; 165/104 M; 236/49

[56] References Cited

U.S. PATENT DOCUMENTS

| | | | |
|---|---|---|---|
| 2,677,367 | 5/1954 | Telkes | 126/436 |
| 3,952,947 | 4/1976 | Saunders | 126/429 |
| 4,160,443 | 7/1979 | Brindle et al. | 126/430 |
| 4,162,671 | 7/1979 | Christy | 126/400 |
| 4,166,445 | 9/1979 | McGraw | 126/432 |

*Primary Examiner*—James C. Yeung
*Attorney, Agent, or Firm*—Jack D. Slobod

[57] ABSTRACT

Vehicular tires are generally toroidal heat collection elements of a solar heating system. Liquid or gaseous fluid flow is circulated between the tires and a space to be heated for transferring the heat from the tires to the space. The tires are generally vertically stacked within a thermally insulated enclosure which includes a double glazed window located that solar rays impinge on and heat the tires. Heat storage media such as water, rock or pebble beds, or phase change material in an elongated coiled jacket may be provided within the tires. Downwardly inclined vanes either partially cut from the tire walls or attached to the tires or attached to separators between the tires, provide additional surface area to absorb the solar radiation and to also direct airflow radially inward into the center of the tires. When the vanes are formed by cutting from the tires, they are naturally hinged for elevational angulation and a cable linkage is provided to simultaneously adjust the elevation of the vanes or to close the apertures in the tire walls formed by the cutting out of the vanes. The window is selectively obstructed from light and heat transfer therethrough either by means of a removeable cover or by thermally insulating sliding opaque sheets within the walls of the enclosure which are selectively positionable between the double glazing.

30 Claims, 18 Drawing Figures

U.S. Patent  Sep. 23, 1980  Sheet 1 of 4  4,223,666
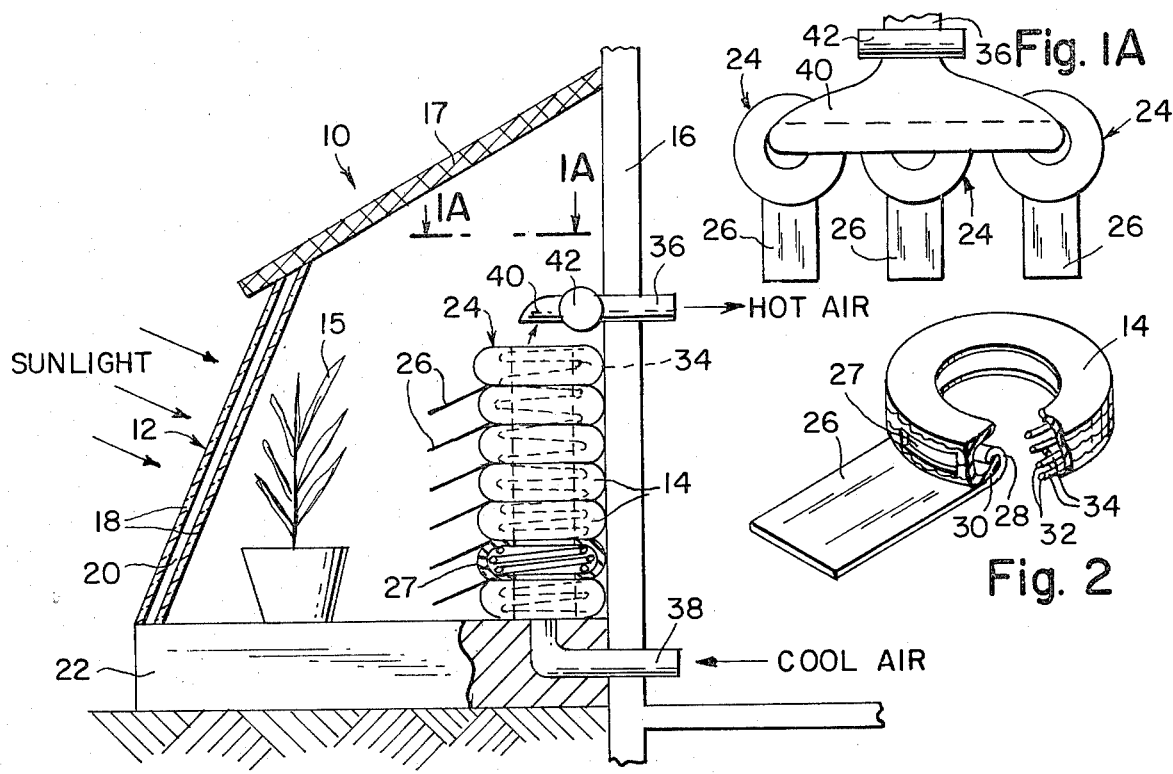
Fig. 1A
Fig. 1
Fig. 2
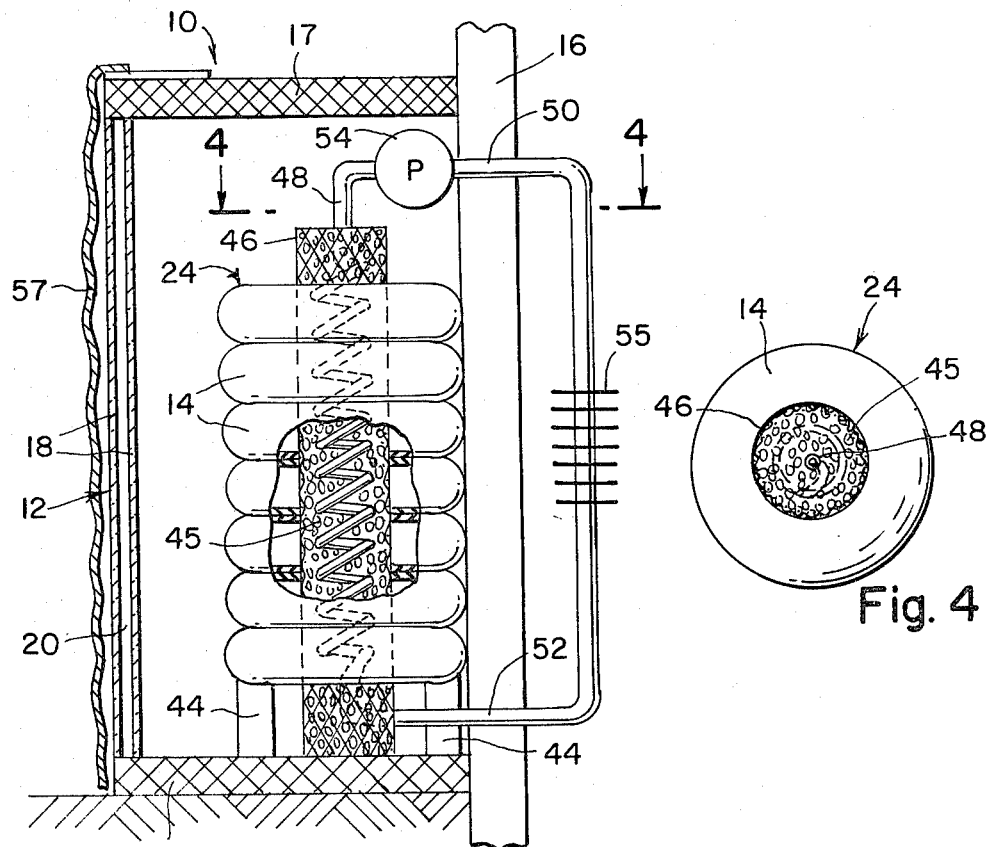
Fig. 3
Fig. 4

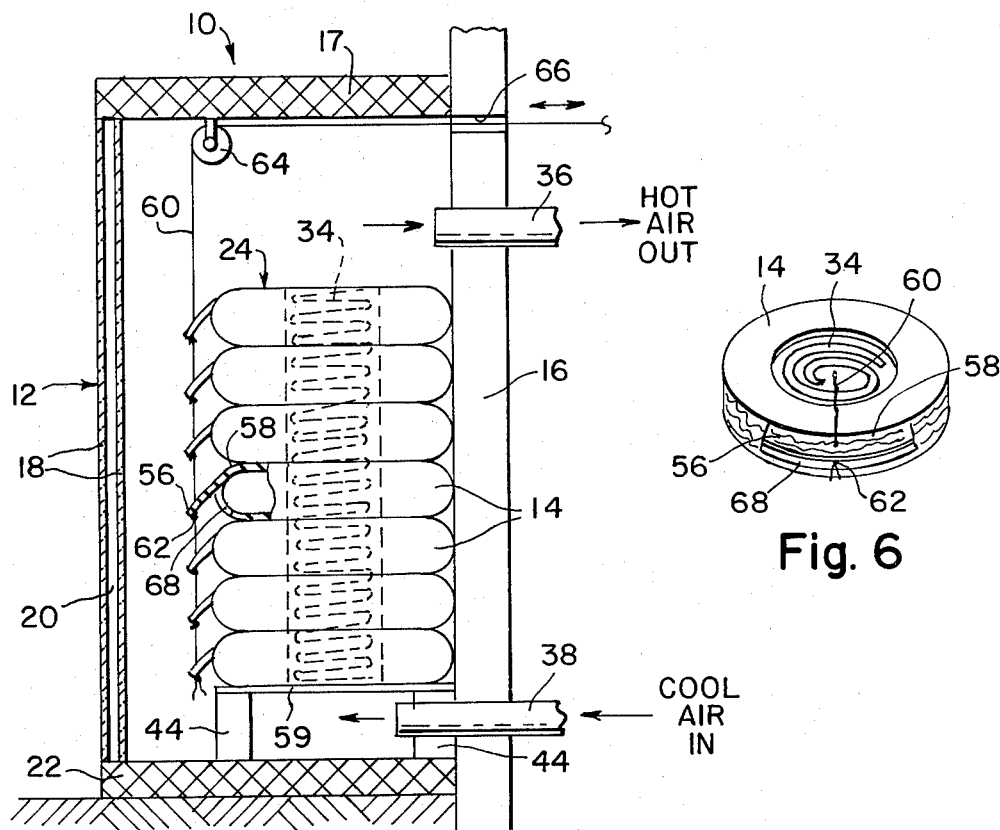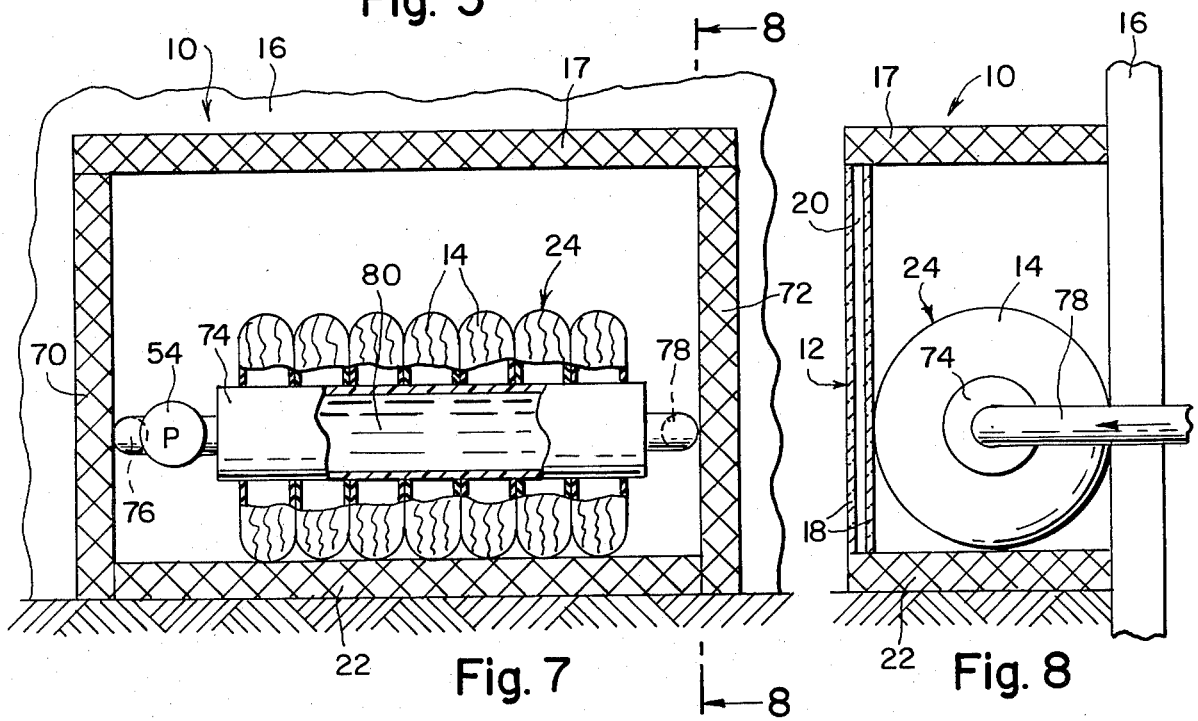

U.S. Patent  Sep. 23, 1980  Sheet 3 of 4  4,223,666
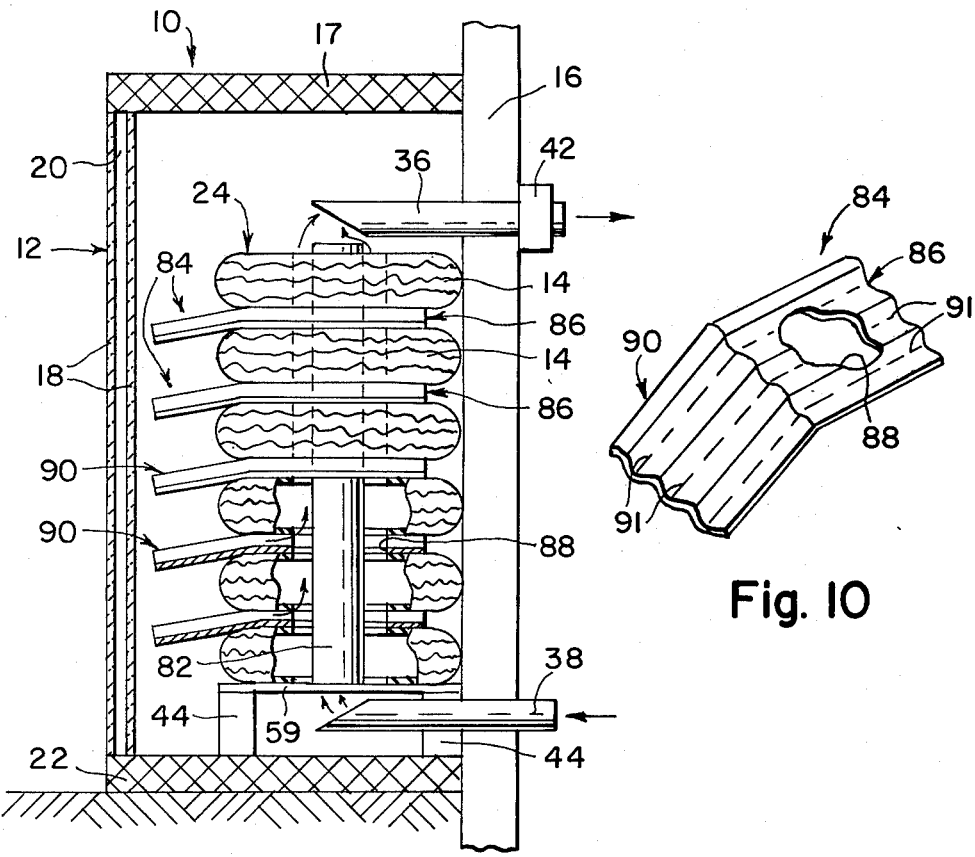
Fig. 9
Fig. 10
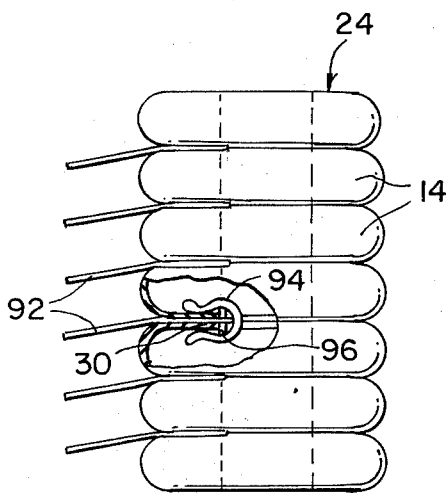
Fig. 11
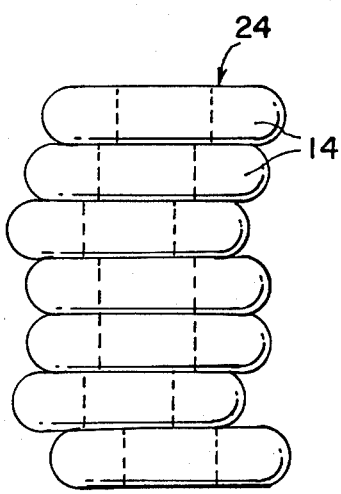
Fig. 12

TOROIDAL SOLAR COLLECTION AND ENERGY STORAGE APPARATUS

FIELD OF THE INVENTION

The present invention relates to solar heating systems. In its particular aspects, the present invention relates to a solar collector which includes generally toroidal members as the elements which are illuminated and heated by solar radiation.

BACKGROUND OF THE INVENTION

A great variety of shapes and configurations of solar collectors have heretofore been proposed. While all solar collectors generally are illuminated and heated by solar radiation, the efficiency of energy collection depends upon the size, shape, configuration, color, materials and surface characteristics of the collector. In the search for greater efficiency, market acceptance has been hindered by ever-increasing component costs. Furthermore, most solar collectors are configured to be built into new construction rather than to be added to previously existing structures.

Solar heating systems often include elements for the storage of thermal energy which may either be remote from the solar collector or may function as the solar collector or a part thereof. The need for space inside the structure to be heated for the usual thermal energy storage elements such as a mass of masonry, rocks of water further adds to the expense of presently known solar heating systems. In addition, large temperature fluctuations often result from systems in which a thermal energy storage element of the aforementioned types is in thermal contact with the spaced to be heated.

The key to the advancement and market acceptance of solar heating systems is to form a solar collector from readily available cheap elements having the appropriate thermal characteristics. The usual elastomeric black vehicular tires have excellent solar energy absorption characteristics. As used tires, they are available cheaply, if not at no cost, in tremendous quantities, and provide an ideal building block for a solar collection and thermal energy storage apparatus. In addition, utilization of previously used vehicular tires in such a fashion provides a needed mode of recycling this vast waste material.

OBJECTS OF THE INVENTION

It is an object of the present invention to provide a solar energy heating system in which a plurality of generally toroidal members are provided within an enclosure having a window positioned to allow the sun's rays to heat the members, in conjunction with fluid circulation means for exchanging heat between the members and a space or medium to be heated.

It is a further object of the present invention to provide dark vanes extending from the generally toroidal members to provide additional surface area for heat absorption.

It is yet another object of the present invention to utilize the space within the generally toroidal members for the placement of thermal energy storage media.

It is still another object of the present invention to provide the generally toroidal members in a substantially vertical stack and to space apart the members vertically to allow airflow between the interior and exterior of the members.

SUMMARY OF THE INVENTION

Briefly, the aforementioned and other objects of the present invention are satisfied by providing a solar energy heating system in which a plurality of generally toroidal members, preferably used vehicular tires, within a thermally insulated enclosure form a solar collector. The enclosure has a southerly facing window through which solar radiation passes during most of the daylight hours and heats the members. While the members may be provided randomly located and oriented within the enclosure, they are preferably provided in a vertical stack in the interest of achieving a high packing density of members and also for creating vertical convection currents along the stack which may provide heat transfer by air circulation through appropriate air ducts coupling the enclosure to a space to be heated. Rather than relying entirely upon convection currents, airflow can be established or aided by fans or blowers. Also the cylindrical geometry of the stack provides a substantially constantly exposed surface to pick up solar energy through the southerly facing window as the azimuthal direction of the sun varies.

A further feature of the invention is the provision of thermal energy storage media within the central cylindrical airspace defined by the members. Such media may be a rock bed, containers filled with water or other well-known thermal energy storage media. The media is provided in contact with the inside diameter of the members in order to be heated thereby. The hollow toroidal interior can provide an insulating airspace to thermally isolate the media when desired. Alternatively, it also may be filled with thermal energy storage media.

Another type of thermal energy storage media, which is particularly efficient is phase change material, preferably in the form of salt hydrates or their eutectics. Such material may be provided in an elongated flexible tube or jacket, sealed at both ends. The tube or jacket may be coiled loosely within the interior of the tire stack. The loose coiling allows space for airflow in contact with the coils.

When storage media is used, heat transfer from the media to the space or medium to be heated is accomplished by circulating a fluid such as air or liquid between the media and the space. In the case of heat transfer by air circulation, passage of air from the outside of the stack to the interior is enabled either by spacing the members apart by separators, or by partially cutting out naturally hinged vanes from the exterior of the members. When cut from the southerly facing part of the member circumference, the vanes, which are preferably downwardly inclined, provide additional surface area for heat absorption as well as serving to direct air through the apertures in the circumference of the members resulting from cutting out the vanes. As a further feature of the invention, these vanes may be coupled together by an externally operable linkage such as a cable and pulley, for simultaneous elevational rotation, whereby the angle of the vanes may be adjusted, and also whereby, the apertures formed in the circumference of the members may be selectively closed to allow the airspace within the generally toroidal members to serve as thermal insulation around the storage media. Also, rather than cutting vanes out of the members, vanes may be provided clamped to the members or be attached to the separators if used. Instead of using airflow to transfer heat from the members or storage media to the space or medium to be heated, a liquid such as water can be circulated in a conduit which passes through the media and which is coupled, for example, to a radiator in the space to be heated.

The enclosure is preferably shaped such that the window area may be arcuate to enable illumination of the toroidal members throughout the azimuthal movement of the sun during daylight hours. A reflective and thermally insulating removeable cover may be provided for the window area for aiding thermal energy retention in the stack during nighttime and also to prevent the stack from being heated when it is desired to utilize the thermal energy storage media within the stack for cooling the space whose temperature is to be controlled. In order to enable the thermal storage media to be used for heating or cooling, the fan or blower may be provided as reversible.

The enclosure, including the window, may be of cylindrical double walled construction, in which case, slideably mounted curved opaque and thermally insulating sheets between the walls may be selectively slid between the double glazing of the window to perform a function similar to the removeable cover aforementioned.

Other objects, features and advantages of the present invention will become apparent upon perusal of the following detailed description of the preferred embodiments thereof when taken in conjunction with the appended drawing.

BRIEF DESCRIPTION OF THE DRAWING

FIG. 1 is a side elevational view of an embodiment of the stacked tire solar collection and energy storage apparatus of the present invention partially broken away in cross-section;

FIG. 1A is a downwardly looking view taken through lines 1A—1A in FIG. 1;

FIG. 2 is a pictorial three-dimensional view of one of the tires in FIG. 1, partially broken away;

FIG. 3 is a side elevational view of another embodiment of the solar collection and energy storage apparatus of the present invention partially broken away in cross-section;

FIG. 4 is a cross-sectional top view taken along the lines 4—4 in FIG. 3;

FIG. 5 is a cross-sectional side elevational view of another embodiment of the stacked tire solar collection and energy storage apparatus of the present invention;

FIG. 6 is a pictorial three-dimensional view of one of the tires in FIG. 5;

FIG. 7 is a front elevational view of another embodiment of the solar collection and energy storage apparatus of the present invention with front glazing removed;

FIG. 8 is a side cross-sectional elevational view taken along the lines 8—8 in FIG. 7 but with the front glazing in place;

FIG. 9 is a side elevational view of another embodiment of the solar collection and energy storage apparatus of the present invention partially broken away in cross-section which utilizes separators between the stacked tires;

FIG. 10 is a three-dimensional pictorial view of one of the separators in FIG. 9;

FIG. 11 is a side elevational view, partially broken away in cross-section, of another embodiment of the stacked tire portion of the solar collection and energy storage apparatus of the present invention;

FIG. 12 is a side elevational view of another embodiment of the stacked tire portion of the solar collection and energy storage apparatus of the present invention;

DETAILED DESCRIPTION OF THE PREFERRED EMBODIMENTS

Figure 13:
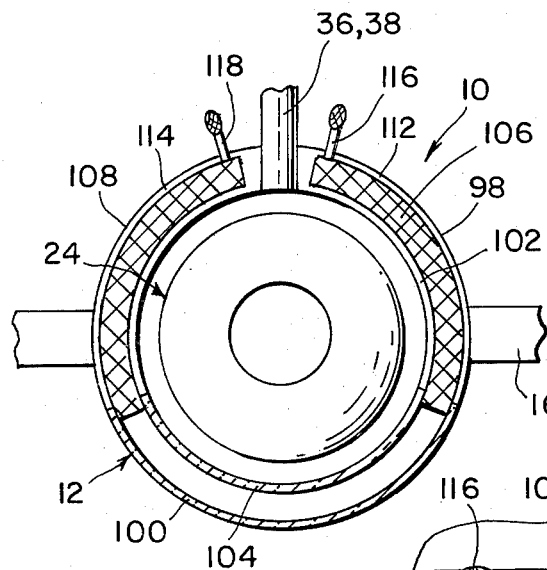
FIG. 13 is a downwardly looking cross-sectional view taken through the front glazing of another embodiment of the solar collection and energy storage apparatus of the present invention shown with moving parts positioned for daytime use.

The present invention envisions a thermally insulated enclosure 10 constructed proximate and preferably adjacent and external of a space such as a building to be heated. The enclosure includes a generally southerly facing translucent or transparent window 12 or window area through which solar radiant light energy enters enclosure 10 and illuminates generally toroidal substantially black elastomeric heat collection members within the enclosure which are heated by said illumination. The members are preferably used vehicular tires 14 because of their ideal heat absorption characteristics, abundance and inexpensive cost. Various means for increasing the heat collection efficiency of the tires, for providing heat transfer between the tires and a space to be heated, and for utilizing thermal energy storage media in conjunction with the tires are set forth in regard to the embodiments described herein.

One embodiment of the solar collection apparatus of the present invention is illustrated in FIGS. 1, 1A and 2 of the drawing. Therein, enclosure 10 (as in the other embodiments illustrated in the drawing) includes as its rear wall 16, a portion of the thermally insulated exterior south wall of a building to which heat is to be supplied. Enclosure 10 of FIG. 1 is stylized in the form of a greenhouse and may include plants 15 within the enclosure. This stylization is achieved by providing enclosure 10 with a slanted roof 17, which is preferably made thermally insulating in nature as with a lining of fiberglass insulation (not shown). Th southerly facing window 12 of the enclosure is inclined and is composed of a pair of parallel spaced apart panes 18 of glass or other translucent material defining a thermally insulating airspace 20 between the panes 18. The foundation 22 of enclosure 10 is also preferably constructed of a thermally insulating nature to the extent possible.

Within the enclosure 10 of FIG. 1 are provided a plurality of vertical stacks 24 of substantially coaxial tires 14, which are preferably located so that the stacks may be simultaneously directly and fully illuminated by sunlight. Therefore the stacks 24 are preferably alongside each other as shown in FIG. 1A. The stacks, being of generally cylindrical configuration, present circumferential surface area for illumination as the azimuthal direction of sunlight incidence varies during the daylight hours.

In order to increase the surface area available for illumination and heating by solar radiant energy entering through window 12, each tire 14 of the stacks 24 (with the exclusion of the bottom tire of each stack) has projecting therefrom towards window 12, a downwardly inclined generally planar thermally absorptive and conductive vane, as of substantially flat black painted metal. Each vane 26, as is apparent from FIG. 2, includes at its upper end an upwardly directed rolled portion 28 that is hooked around the lower interior lip 30 of the associated tire. An angularly elongated aperture 27 is cut in the circumference of each tire 14 directly above each vane 26. As the vertically spaced apart vanes 26 are illuminated and heated, this heat is transferred to the stack 24 by conduction and also by convection as rising air heated by the upward face of each vane 26 enters stack 24 through the aperture 27 above the vane.

In order to increase the heat storage capacity of the stacks 24, a phase change material 32 preferably having a heat of fusion in excess of 50 BTU per pound and a melting point ranging between 75 and 120 degrees Fahrenheit is provided filling an elongated flexible thin-walled (e.g. 1/16 inch) plastic or elastomeric tube 34 or jacket about 1 inch in diameter. The plastic utilized such as polyolefin should include about 35% by weight of carbon black metallic oxide, or metal flakes to render the wall of tube 34 thermally conductive. The ends of the tube are sealed and the tube is continuously coiled with the toroidal hollow of each tire 14 and from one tire to the other. Suitable phase change materials generally consist of salt hydrates, such as sodium sulfate decahydrate, or their eutectics. Suitable compositions therefor including nucleating and homogenizing agents are detailed in U.S. Pat. No. 3,986,969 to Maria Telkes granted Oct. 19, 1976. Other phase change materials such as waxes are known but not generally preferred because of flammability. Further, other configurations of holders for the phase change material, which are adaptable to the hollow toroidal interiors of tires 14 might also be used. It will be appreciated that as the tires 14 are heated, this heat is transferred by conduction and convection, to and stored in the phase change material filled tube 34. While other heat storage media such as rocks, water and the like may be used as illustrated in the other embodiments herein, it is well known that phase change material provides the greatest energy storage ability per unit weight or per unit volume.

The stored thermal energy in the stacks 24 is transferred to within the building adjoining the enclosure 10 by means of fluid ducts. In FIGS. 1 and 1A, air is utilized as the heat transfer fluid. Therein, an output or hot air duct 36 is directed through the common wall 16 proximate the top of the enclosure 10 and an input or cold air duct 38 is directed into the enclosure 10 through common wall 16 and through foundation 22. Both ducts 36 and 38 terminate in belled portions or distributors 40 which direct airflow through the center of each of the stacks 24. While some recirculating air currents through the center of the stacks 24, out the hot air duct 36, and eventually returning to the cold air duct 38 will be set up by convection within the interior of each stack, preferably an electrically driven blower or fan 42 should be provided in series with duct 36 or 38 to aid this airflow. The airflow aforementioned causes heat from the tires 14 and phase change material 32 to be transferred to within the interior of the building against which the enclosure 10 is constructed via the ducts 36, 38.

Many variations in the solar energy collection and storage apparatus of the present invention are possible. In the embodiment illustrated in FIGS. 3 and 4, the thermally insulating roof 17 is a flat one and the window 12 is vertical. A stack 24 of tires 14 is set upon masonry blocks 44 which in turn rest on foundation 22. Thermal energy storage media in the form of rocks or pebbles 45 fill a vertical cylinder 46 of wire mesh which is set within the stack 24 in contact with the inside diameters of tires 14.

A water filled pipe 48, as of flexible copper tubing or thermally conductive plastic or elastomeric tubing passes through common wall 16, at 50, near the top of enclosure 10 is directed through the rocks 45 and is formed into a helix within, coaxial with, and generally running the length of cylinder 46. Near the bottom of cylinder 46 the pipe 48 exits radially through the wall of the cylinder and is directed between blocks 44 and through the lower part of wall 15 at 52. By providing water pipe 48 in the form of a helix within cylinder 46, it is in intimate contact with rocks 45.

The portions 50 and 52 of pipe 48 which pass through wall 16 are connected together within the building to be heated by a radiator 55 in series with the pipe and an electrically driven pump 54 is also provided in series with the pipe to recirculate the water therein.

It will be appreciated that the tires 14 of stacks 24 are heated by the sunlight passing through window 12 which is incident upon the stack. This heat is transferred to and stored in the rocks or pebbles 45 within the wire mesh cylinder 46. When pump 54 is turned on, heat from tires 14 and rocks 45 is transferred to the building to be heated by means of the recirculation of water in the pipe 48 carrying heat to radiator 55. During winter evenings, to provide additional thermal insulation at the window 12 to prevent heat leaking from the stack 24 therethrough, a removeable exterior thermally insulating and opaque cover or curtain 57 may be provided over the window. Additionally, during summer days the window may be covered with cover 57 to maintain the stack in a somewhat cool condition, and the water circulation within pipe 48 may be utilized to cool the building, by taking in heat energy at the radiator 55 and transferring it to the stack 24.

As a further feature, the radiator 55 might be replaced with a water tank (not shown) within the building and the apparatus of FIG. 2 could be utilized as a hot water heater.

It will be appreciated that air trapped within the toroidal interior of each tire 14 provides an effective thermal insulating barrier against heat transfer between the rocks 45, or other energy storage media, within the cylindrical interior of the stack 24 and the air space surrounding the stack.

In the embodiment illustrated in FIGS. 5 and 6, the stack 24 is set upon a planar mesh screen or apertured plate 59 which rests upon blocks 44. A hot air duct 36 is directed through common wall 16 above the stack and cold air duct 38 is directed through wall 16 and between blocks 44 below the stack. The open ends of ducts 36 and 38 within enclosure 10 are located so as to receive and recirculate rising air within the center of the stack between the enclosure 10 and the building to be heated. Tube 34, containing phase change material, is loosely coiled in the central cylindrical space within stack 24 so as to be heated by the tires 14. Instead of using rigid heat collection vanes as in the embodiment of FIG. 1, a louver or flap 56 is cut from a southerly facing sector of the circumference of each tire and is naturally hinged to each tire at 58 proximate the upper part of the circumference. A vertically directed cable 60 is passed through each flap 56 and a plurality of knots 62 in cable 60 or beads fixedly attached to cable 60 are provided in spaced apart relationship for bearing on the underside of each flap 56 to support each flap in downwardly inclined orientation. The upper end of cable 60 passes over a pulley 64 carried by the underside of roof 17, and is directed through a hole 66 in common wall 16. By pulling cable 60 from within the building to be heated, all of the flaps 56 may be simultaneously angulated to any desired orientation, preferably to receive the maximum amount of sunlight. The flaps 56 may be maintained in any desired orientation by tying off the end of cable 60 within the building.

An aperture 68 in each tire circumference is formed as a result of cutting out each flap 56. As solar radiant energy is absorbed on the upper side of each flap 56 the heat generated will produce heated air that will rise and pass through the aperture 68 of the tire above and into the center of stack 24.

In order to selectively trap air within the toroidal hollow of the tires 14, to thermally insulate the phase change material filled tube 34 during evening, the tension on cable 60 can be released so that the flaps 56 substantially close aperture 68.

While in the embodiments heretofore discussed, the tires 14 have been preferably provided in a vertical stack or stacks, there are situations in which they may or should be differently arranged within enclosure 10. One such example is illustrated in the embodiment of FIGS. 7 and 8. Therein, the enclosure 10 is relatively short in height and relatively long in width and includes the thermally insulating flat roof 17, the thermally insulating sidewalls 70, 72 and the thermally insulating foundation 22. The tires 14 are provided standing on their circumferential or tread portions and are in side by side relationship adjacent each other within enclosure 10.

An elongated horizontally directed cylindrical water filled tank or bag 74 of thermally conductive material, such as metal or black plastic, is fitted tightly within the central cylindrical space with the horizontal stack 24 of tires 14 in contact with the inside diameters of the tires. Input and output pipes 76, 78 respectively exit the tank 74 at opposite ends thereof and pass through common wall 16 at the rear of enclosure 10 and a pump 54 is provided in series with one of the pipes 76 or 78.

As the tires 14 are heated by incident solar energy passing through the front window 12 of the enclosure 10, this heat is transferred to the tank 74 and the water 80 contained therein. Thus, the water 80 is heated by incident solar radiant energy.

The input pipe 78 may be connected to the usual source of cold water within the building adjacent enclosure 10 and the output pipe 76 may be connected to the hot water input lines of the building. As previously explained, the heated water may also be recirculated through a radiator within the building for environmental heating purposes. It will be appreciated that by providing the stack 24 in a horizontal orientation and the consequent horizontal orientation of tank 74, the work which must be performed by pump 54 in transferring the water 80 therein is much less than if the tank were vertically oriented.

FIGS. 9 and 10 illustrate another embodiment of the solar energy collection and storage apparatus of the present invention in which a vertical stack 24 of tires 14 is set upon a planar apertured plate or wire mesh screen 59 which in turn is set upon blocks 44. A rigid sealed cylindrical water-filled tank 82 is set vertically in the center of the stack and is supported by plate or screen 59. Tank 82 has an outside diameter smaller than the inside diameter of tires 14 to provide an annular space between the tank and the tires for vertical airflow. A plurality of black painted corrugated metal separators 84 are interleaved between adjacent tires 14 of stack 24. Each separator includes a first portion 86 which lies between adjacent tires 14 and a second or vane portion 90 which is bent at an obtuse angle with respect to portion 86. Portion 86 has a central aperture 88 of about the same diameter as the inside diameter of tires 14 and is positioned concentric with the tires. Vane portion 90 projects in a downwardly inclined direction toward window 12 to serve as a vane for energy absorption. The corrugations of separator 84 are directed and configured such that the valleys 91 of the corrugations in the upper side of the separator provide conduits on the order of two inches in height for heated air to flow radially inward along the top of portion 90 and then along the top of portion 86 and into the aforementioned annular space between the inside diameter of tires 14 and the outside diameter of tank 82. Thus, as the upper side of each vane portion 90 is heated by solar radiant energy, rising heated air produced above each vane portion enters, via valleys 91, the annular space between the tank 82 and the tire 14 above the vane to produce heating of the tank and the water therein.

This heat is transferred to the adjacent building by means of the hot air duct which passes through common wall 16 above stack 24 and the cold air duct 38 which passes through common wall 16 below stack 24. Fan or blower 42 is provided in series with one of the ducts, such as 36, to force a recirculating airflow between enclosure 10 and the adjacent building via the ducts 36, 38. This recirculating airflow path includes vertical airflow in the annular space between tank 82 and tires 14 for transferring the thermal energy stored in the water within tank 82 to the building to be heated.

As illustrated in FIG. 11, vane members 92 may be utilized which are radially directed from and are sandwiched between adjacent tires 14 of vertical stack 24 and which includes spring clip elements 94 fixedly attached to the vane members as by a pin 96. These spring clip elements may be configured to grip the inwardly directed lips 30 of tires 14 to maintain the tires 14 of the stack 24 in a generally coaxial orientation. However, as illustrated in FIG. 12, the provisions of the tires 14 in coaxial relationship is not absolutely essential to the principles of the present invention and some relative offset of the tires will not dramatically affect the solar collection efficiency of the stack 24.

Figure 16:
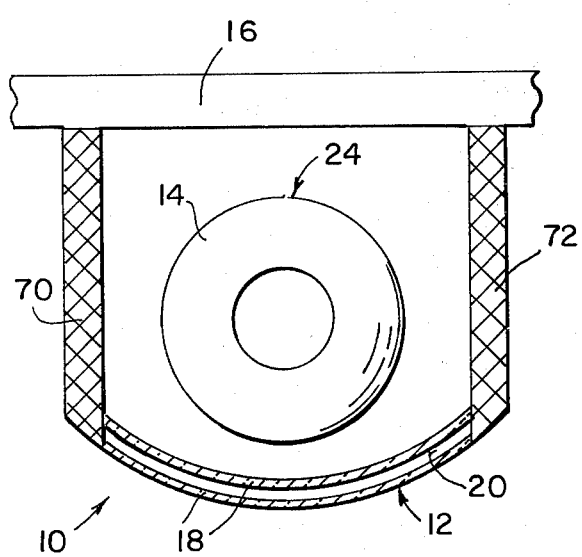
FIGS. 16 and 17 are downwardly looking cross-sectional views taken through any of the embodiments of FIGS. 1, 3, 5 and 9 respectively, illustrating alternative constructions.
Figure 17:
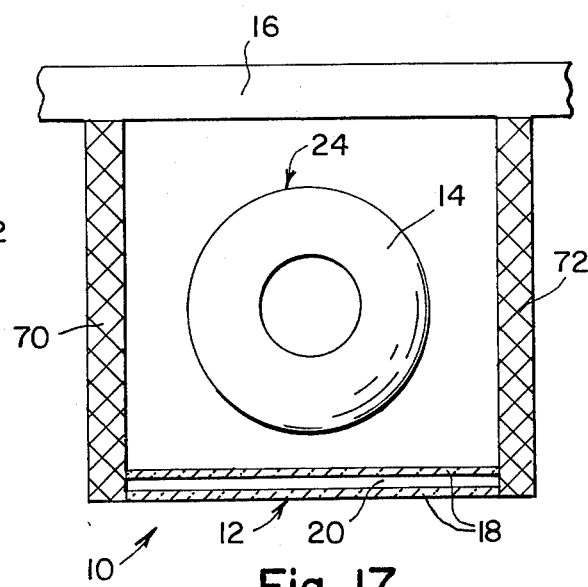

Furthermore, the shape of the enclosure 10 may take a variety of forms. As illustrated in FIG. 17, the window 12 may be provided flat and perpendicular to sidewalls 70, 72 for the cheapest construction. However, as illustrated in FIG. 16, by providing the window 12 as curved in the azimuthal direction, the stack 24 can be exposed to sunlight during a longer period of day as the azimuthal direction of solar energy incidence varies.

Figure 14:
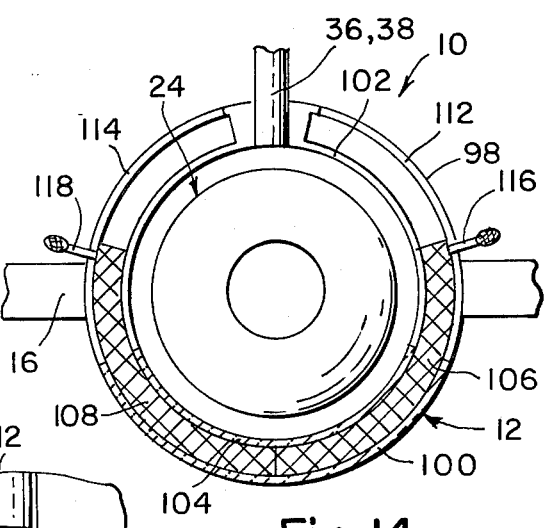
FIG. 14 is a view similar to FIG. 13 except with the moving parts positioned for night use.
Figure 15:
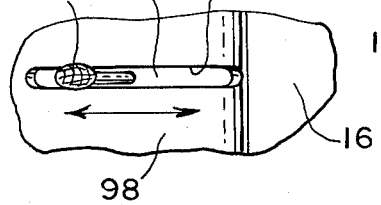
FIG. 15 is a partial side elevational view of the apparatus in FIG. 14.

Furthermore, the enclosure 10, as illustrated in FIGS. 13 through 15, can be completely cylindrical in which case the rear half of the enclosure would pass through common wall 16. In such a case it is beneficial to make the enclosure 10 completely of double wall construction including the outer cylindrical wall 98 having the southerly facing curved glass 100 and the concentric inner cylindrical wall 102 having the southerly facing curved glass pane 104. Then a pair of thermally insulating, reflective and opaque curved sheets 106, 108 as of white foamed plastic, may be slideably mounted in the airspace between the cylindrical walls for angular movement respectively over the easterly and westerly portions of the enclosure 10 on opposite sides of the vertically spaced apart air ducts 36, 38 passing rearwardly from the enclosure 10 into the building to be heated. A pair of angularly directed horizontal slots 112, 114 are provided in the portion of outer wall 98 on the north side of common wall 16, respectively on opposite sides of ducts 36, 38, and handles 116, 118 are respectively fixedly attached attached to the sheets 106, 108 and pass slideably respectively through slots 112, 114. The sheets 106, 108 are of an angular extent such that they may be selectively positioned by means of handles 116, 118 between the concentric window panes 100, 104. Thus, when the ability to selectively block the window 12 by means of the sheets 106, 108, a similar function may be achieved as with the removeable cover or curtain 57 in FIG. 3.

While the preferred embodiments of the present invention have been described in specific detail it should be understood that numerous modifications, substitutions and omissions are possible in these details within the intended spirit and scope of the present invention. For example, combinations of the various thermal energy storage media types and configurations might be utilized in conjunction with the same tire stack.

I claim:

1. A solar energy heating system for cooperation with a space to which thermal energy is to be supplied, said system comprising:
    an enclosure proximate said space, said enclosure having a generally translucent window area oriented for permitting entry of solar radiant energy into said enclosure;
    a plurality of generally toroidal, substantially black, elastomeric, hollow, vehicular tire-like members within said enclosure located proximate each other and positioned relative to said window area so as to be heated by absorbing the solar radiant energy entering said enclosure through said window area;
    heat storage media within said members; and
    means, including fluid duct means interconnecting said enclosure to said space, for transferring the solar energy absorbed by said tire-like members to said space.

2. The system of claim 1 wherein said tire-like members are positioned substantially coaxially in a vertical stack.

3. The system of claim 2 further comprising a plurality of vertically spaced apart downwardly inclined vane means attached to and extending radially outward from said stack toward said window area so as to be illuminated and heated by said solar radiant energy entering said enclosure.

4. The system of claim 3 wherein each said vane means comprises a naturally hinged louver cut from and extending outward from the circumference of each tire-like member.

5. The system of claim 4 further comprising linkage means coupling said louvers for simultaneous elevational angulation, said linkage means terminating external of said enclosure for enabling elevational adjustment of said louvers.

6. The system of claim 1 further comprising a downwardly inclined vane means attached to and extending radially outward from each tire-like member toward said window area so as to be illuminated and heated by said solar radiant energy entering said enclosure.

7. The system of claim 6 wherein each said vane means comprises a naturally hinged louver cut from and extending outward from the circumference of each tire-like member.

8. The system of claim 7 further comprising linkage means coupling said louvers for simultaneous elevational angulation, said linkage means terminating external of said enclosure for enabling elevational adjustment of said louvers.

9. The system of claim 6 wherein said tire-like members are positioned substantially coaxially in a vertical stack, and further comprising vertical separator means interleaved between the tire-like members of said stack, said separator means being configured to permit airflow between the outside of said stack and said media, said plurality of vane means being attached to said separator means and being positioned for directing said airflow.

10. The system of claim 1 wherein said enclosure including said window area is of substantially double wall construction, and substantially opaque thermally insulating sheet means mounted slideably within the double walls of said enclosure so as to be selectively positionable within the double walls of said window area for selectively obstructing light and heat passage through said window area.

11. The system of claim 10 wherein said enclosure is substantially cylindrical, said window area being formed in a portion of the cylindrical wall of said enclosure, said sheet means being arcuately shaped.

12. The system of claim 1 wherein said heat transferring means includes liquid circulation means, said fluid duct means comprising input and output liquid conduits, and further comprising an elongated liquid conduit within said enclosure in thermal contact with the heat storage media within said tire-like members and coupled at opposite ends respectively to said input and output liquid conduits.

13. The system of claim 12 wherein said tire-like members are positioned substantially coaxially in a vertical stack.

14. The system of claim 13 further comprising a plurality of vertically spaced apart downwardly inclined vane means attached to and extending radially outward from said stack toward said window area so as to be illuminated and heated by the solar radiant energy, entering said enclosure.

15. The system of claim 14 wherein each said vane means comprises a naturally hinged louver cut from and extending outward from the circumference of each tire-like member.

16. The system of claim 1 further comprising an elongated flexible jacket sealed at both ends; said heat storage media comprising phase change material within said jacket; said jacket being coiled with each tire-like member.

17. The system of claim 16 wherein said generally toroidal members positioned substantially coaxially in a vertical stack.

18. The system of claim 17 further comprising a plurality of vertically spaced apart downwardly inclined vane means attached to and extending radially outward from said stack toward said window area so as to be illuminated and heated by said solar radiant energy entering said enclosure.

19. The system of claim 18 wherein each said vane means comprises a naturally hinged louver cut from and extending outward from the circumference of each tire-like member.

20. The system of claim 16 further comprising a downwardly inclined vane means attached to and extending radially outward from each tire-like member toward said window area so as to be illuminated and heated by said solar radiant energy entering said enclosure.

21. The system of claim 20 wherein each said vane means comprises a naturally hinged louver cut from and extending outward from the circumference of each tire-like member.

22. The system of claim 1 wherein said heat transferring means includes an output air vent formed in a wall of the enclosure proximate the top of the enclosure; an input air vent formed in a wall of the enclosure proximate the bottom of the enclosure; said fluid duct means comprising input and output air ducts respectively coupling said input output vents to said space to be heated; whereby rising air within said enclosure due to heat from said stack forces air circulation between said spaced and said enclosure via said input and output air duct means.

23. The system of claim 22 further comprising a plurality of vertically spaced apart downwardly inclined vane means attached to and extending radially outward from said stack toward said window area so as to be illuminated and heated by the solar radiation entering said enclosure.

24. The system of claim 23 wherein each said vane means comprises a naturally hinged louver cut from and extending outward from the circumference of each tire-like member.

25. A solar energy heating system for cooperation with a space to which thermal energy is to be supplied, said system comprising:
an enclosure proximate said space, said enclosure having a generally translucent window area oriented for permitting entry of solar radiant energy into said enclosure;
a plurality of generally toroidal, substantially black, elastomeric, hollow, vehicular tire-like members within said enclosure located proximate each other and positioned relative to said window area so as to be heated by absorbing the solar radiant energy entering said enclosure through said window area;
downwardly inclined vane means attached to and extending radially outward from each tire-like member toward said window area so as to be illuminated and heated by said solar radiant energy entering said enclosure; and
means, including fluid duct means interconnecting said enclosure to said space, for transferring the solar energy absorbed by said tire-like members to said space.

26. The system of claim 25 where said tire-like members are positioned substantially coaxially in a vertical stack.

27. The system of claim 26 wherein each said vane means comprises a naturally hinged louver cut from and extending outward from the circumference of each tire-like member.

28. The system of claim 27 further comprising linkage means coupling said louvers for simultaneous elevational angulation, said linkage means terminating external of said enclosure for enabling elevational adjustment of said louvers.

29. The system of claim 26 wherein each said vane means comprises a naturally hinged louver cut from and extending outward from the circumference of each tire-like member.

30. The system of claim 29 further comprising linkage means coupling said louvers for simultaneous elevational angulation, said linkage means terminating external of said enclosure for enabling elevational adjustment of said louvers.

* * * * *